US012597356B2

(12) United States Patent
Smith et al.

(10) Patent No.: US 12,597,356 B2
(45) Date of Patent: Apr. 7, 2026

(54) SMART SCRATCHPAD DATALINK CHICKLETS

(71) Applicant: Honeywell International Inc., Charlotte, NC (US)

(72) Inventors: Steven Smith, Surprise, AZ (US); Christopher Heine, Mesa, AZ (US); Randy Odish, Tempe, AZ (US)

(73) Assignee: Honeywell International Inc., Charlotte, NC (US)

( * ) Notice: Subject to any disclaimer, the term of this patent is extended or adjusted under 35 U.S.C. 154(b) by 211 days.

(21) Appl. No.: 18/366,609

(22) Filed: Aug. 7, 2023

(65) Prior Publication Data

US 2025/0054395 A1 Feb. 13, 2025

(51) Int. Cl.
*G06F 3/04886* (2022.01)
*G08G 5/21* (2025.01)
*G08G 5/26* (2025.01)

(52) U.S. Cl.
CPC ................. *G08G 5/21* (2025.01); *G08G 5/26* (2025.01)

(58) Field of Classification Search
CPC .. G08G 5/21; G08G 5/26; G08G 5/53; G08G 5/23; G08G 5/24; G06F 3/04886; G06F 3/048
See application file for complete search history.

(56) References Cited

U.S. PATENT DOCUMENTS 9,032,319 B1 * 5/2015 Hammack ............. G06F 3/0481 715/769
9,293,050 B2 3/2016 Judy
9,911,337 B1 3/2018 Shapiro
10,131,444 B1 * 11/2018 Toews ...................... G06F 9/543
10,606,948 B2 3/2020 Hicks et al.
10,732,814 B2 8/2020 Ording et al.
11,305,886 B1 4/2022 Gilbert et al.
2010/0250025 A1 9/2010 Vasek et al.
2015/0212701 A1 7/2015 Rodney et al.
2017/0124734 A1 * 5/2017 Gowda ................... G06T 11/60
2017/0286366 A1 * 10/2017 Chang ................... G06F 40/103

FOREIGN PATENT DOCUMENTS

EP 3396498 B1 11/2019

OTHER PUBLICATIONS

European Patent Office, Extended European Search Report from EP Application No. 24189107.6, Jan. 3, 2025, pp. 1-8, Published in EP.

* cited by examiner

*Primary Examiner* — Jeanette J Parker
(74) *Attorney, Agent, or Firm* — Fogg & Powers LLC

(57) ABSTRACT

One or more datalink labels are displayed on a shared panel of a user interface. The datalink labels are generated in response to receiving a datalink message from at least one ground station. Upon receiving a selection of the datalink label, one or more sub-panels that include information or a representation of the datalink message are displayed on the user interface. In some embodiments, the sub-panel includes a button that, when selected, automatically generates a response message. Utilizing datalink labels in conjunction with the shared panel simplifies datalink messaging and enables messaging functions to be completed on the same screen regardless of which application (or function of an application) is currently displayed on the user interface.

15 Claims, 6 Drawing Sheets

SMART SCRATCHPAD DATALINK CHICKLETS

BACKGROUND

The coordination of many commercial and private aircraft is controlled by the Air Traffic Control (ATC) system. The ATC system includes many ground systems or ground stations that send uplink messages to, and receive downlink messages from, aircraft. Many of these messages are sent as digital messages over a datalink referred to as the Controller-Pilot Data Link Communication (CPDLC). In the future, most of the ATC communication will be carried out through digital media such as CPDLC messages. Many messages are exchanged between the flight crew personnel and the ATC system during a flight. Messages exchanged between the aircraft and the ATC ground station include, but are not limited to, route clearances, lateral diversions, vertical diversions, speed changes, route modifications, and the like.

CPDLC functions can be processed and displayed to flight crew personnel in a variety of different formats. Currently, flight crew personnel must switch between displays and interfaces of multiple avionics devices, or between multiple panels within a display of an avionics device, to coordinate the many functions needed to operate and navigate the aircraft. While performing many of these functions, the flight crew personnel may look at other instruments, gauges, switches, checklists, or other information or equipment to aid in operation of the aircraft. In doing so, the gaze of the flight crew is not focused on the scene in front of the aircraft. Moreover, some CPDLC functions, such as generating and sending a CPDLC message to the ground station, can be time intensive to gather and input the appropriate information, during which time the pilot must focus their attention on navigating through the displays and panels of multiple devices before the CPDLC message is finally approved and transmitted. The longer it takes the flight crew personnel to process CPDLC functions, the greater the likelihood of delays or more problematic, the risk of injury to the aircraft and the personnel onboard.

Thus, there is currently a need for improvements to expedite the various CPDLC functions used by personnel onboard the vehicle.

SUMMARY

The details of one or more embodiments are set forth in the description below. The features illustrated or described in connection with one exemplary embodiment may be combined with the features of other embodiments. Thus, any of the various embodiments described herein can be combined to provide further embodiments. Aspects of the embodiments can be modified, if necessary to employ concepts of the various patents, applications and publications as identified herein to provide yet further embodiments.

In one embodiment, a system configured to be coupled to a vehicle is disclosed. The system comprises at least one processor and a human-machine interface coupled to the at least one processor and comprising a display screen. The human-machine interface is configured to display a first panel of a plurality of panels on the display screen. In response to determining that a first datalink message for the vehicle has been received, the at least one processor is configured to generate a datalink label. The datalink label corresponds to the first datalink message and is configured to be generated in a shared panel of the display screen. The human-machine interface is configured to display the datalink label on the shared panel. The at least one processor is configured to receive a selection of the datalink label. In response to receiving the selection, the at least one processor is configured to generate a sub-panel that includes a representation of the first datalink message. The human-machine interface is configured to display the sub-panel on the first panel.

In another embodiment, an avionics device is disclosed. The avionics device comprises at least one processor. The at least one processor is configured to receive a first datalink message transmitted from at least one ground station. The avionics device comprises a human-machine interface comprising a display screen coupled to the at least one processor. The human-machine interface is configured to display a first panel of a plurality of panels on the display screen. The at least one processor is configured to generate a datalink label. The datalink label corresponds to the first datalink message and is configured to be generated in a shared panel of the display screen. The human-machine interface is configured to display the datalink label on the shared panel. The at least one processor is configured to receive a selection of the datalink label. In response to receiving the selection, the at least one processor is configured to generate a sub-panel that includes a representation of the first datalink message. The human-machine interface is configured to display the sub-panel on the first panel.

In yet another embodiment, a method is disclosed. The method comprises receiving a datalink message from at least one ground station. The method further comprises generating a datalink label in response to receiving the datalink message. The datalink label is displayed on a shared panel of a display screen. The method further comprises receiving a selection of the datalink label displayed on the shared panel. In response to receiving the selection of the datalink label, the method further comprises generating a sub-panel representation of the datalink message. The sub-panel representation is displayed on the display screen.

Other embodiments are also disclosed, as subsequently described.

BRIEF DESCRIPTION OF THE DRAWINGS

Understanding that the drawings depict only exemplary embodiments and are not therefore to be considered limiting in scope, the exemplary embodiments will be described with additional specificity and detail through the use of the accompanying drawings, as subsequently summarized and in the context of the detailed description.

Figure 1:
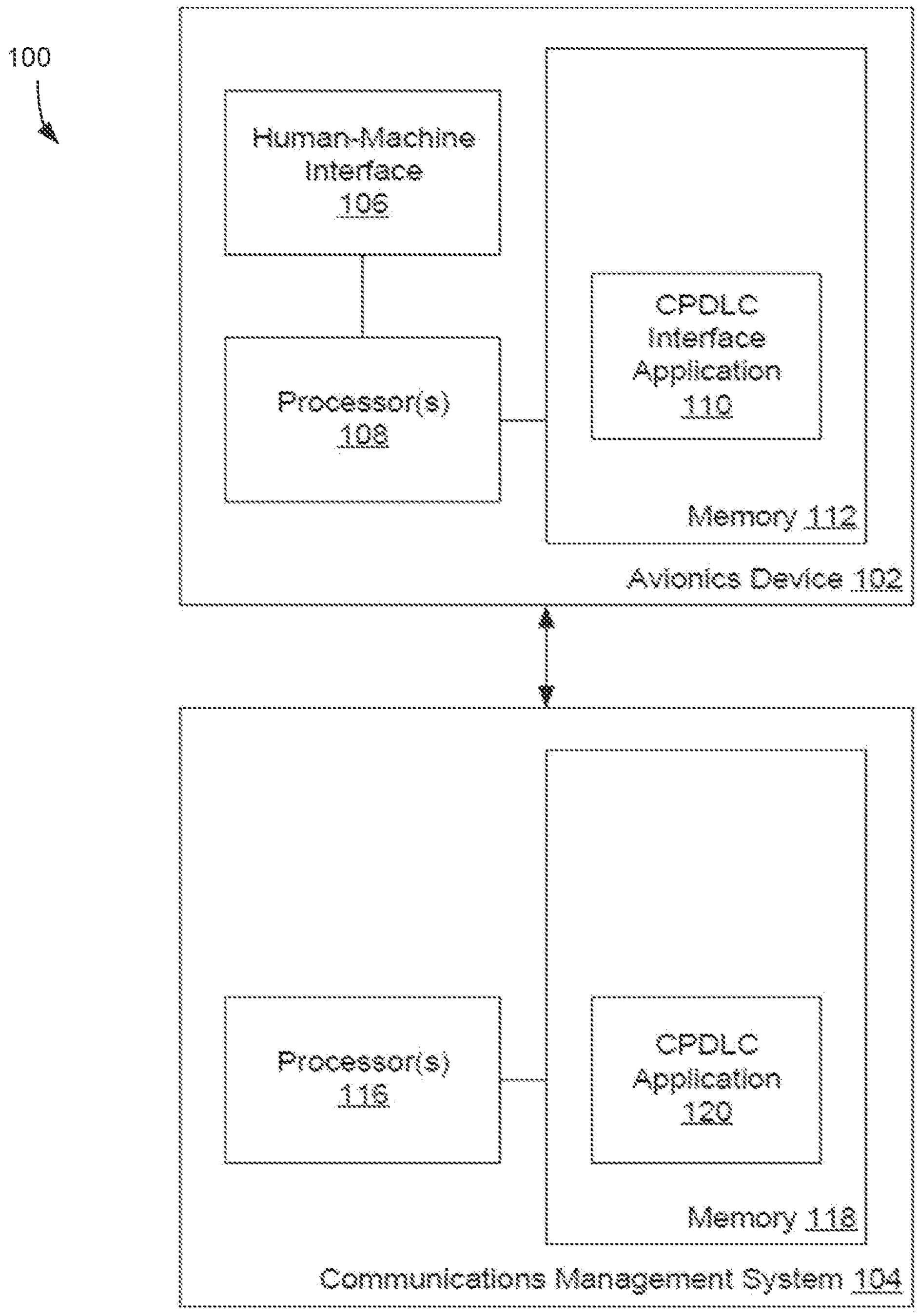
FIG. 1 depicts a block diagram of a system for communicating CPDLC messages on a vehicle, as described in one or more embodiments.

In accordance with common practice, the various described features are not drawn to scale but are drawn to emphasize specific features relevant to the exemplary embodiments.

DETAILED DESCRIPTION

In the following detailed description, reference is made to the accompanying drawings that form a part hereof, and in which is shown by way of illustration specific illustrative embodiments. However, it is to be understood that other embodiments may be utilized and that logical, mechanical, and electrical changes may be made. Furthermore, the method presented in the drawing figures and the specification is not to be construed as limiting the order in which the individual steps may be performed. The following detailed description is, therefore, not to be taken in a limiting sense.

FIG. 1 depicts a block diagram of a system, indicated generally at 100, configured to provide a user interface for creating and displaying CPDLC messages in an aerial vehicle for vehicle personnel. Use of the term "aerial vehicle" is not intended to be limiting and includes all classes of vehicles falling within the ordinary meaning of the term. This includes but is not limited to, commercial, non-commercial, or recreational aircraft, urban air mobility vehicles, and other vehicles. Throughout the disclosure, the aerial vehicle may be further illustrated as an aircraft with the understanding that the principles described herein apply to other aerial vehicles where applicable.

The system 100 includes at least one avionics device 102 coupled to a communications management system 104. Avionics device 102 can be an onboard avionics device that is affixed to (for example, mounted on) the interior of the vehicle, such as the cockpit. Alternatively, avionics device 102 is an offboard avionics device that is portable and can be taken off the vehicle. Examples of onboard and offboard avionics devices include a navigational display device, a primary flight display, a Maintenance Terminal, a Cabin terminal, an electronic flight bag (EFB), or a tablet, smartphone or other portable electronic device (PED) that is configured for running one or more avionics applications with a display or interface. The avionics device 102 includes at least one human-machine interface (HMI) 106 that is configured to display and visualize data to the vehicle personnel (for example, operator and flight crew), and also enables the personnel to input or select data. For example, HMI 106 includes or is coupled to any kind of input device (computer mouse, buttons, switches, and the like). In some examples, HMI 106 includes a screen with touchscreen functionality or cursor selection capability so that the vehicle personnel can input data directly on the screen. HMI 106 can also display data received at avionics device 102 from other systems connected to the vehicle, including other avionics devices 102.

In addition to an HMI 106, the avionics device 102 includes at least one processor 108 and a memory 112. Memory 112 stores a CPDLC interface application 110. Processor 108 receives signals from HMI 106 with input data from the vehicle personnel and other systems and processes the signals to perform one or more functions for the avionics device 102. For example, to utilize the CPDLC functionality of the avionics device 102, processor 108 accesses the instructions of CPDLC interface application 110 and processes input data from the vehicle personnel based on the instructions of CPDLC interface application 110. CPDLC interface application 110 stores multiple CPDLC functions that can be displayed on a plurality of panels on the display screen of the HMI 106. Although not explicitly shown in FIG. 1, processor 108 is configured to implement other functions that may be stored in other applications.

Avionics device 102 is coupled to a communications management system (CMS) 104, e.g., either through a wired connection or wireless connection. The CMS 104 is configured to send downlink messages and receive uplink messages. Optionally, each avionics device 102 registers with CMS 104 before the avionics device 102 receives or transmits data to the CMS 104. In the uplink direction, CMS 104 receives an uplink message from a ground station (not shown in FIG. 1) via a communication link (e.g., via high frequency (HF), very-high frequency (VHF), satellite communications (SATCOM), ACARS over internet protocol (AoIP)), processes the uplink message, and routes the uplink message to one or more avionics devices 102. In the downlink direction, one or more avionics devices 102 transmit a downlink message to CMS 104 where CMS 104 processes the downlink message and transmits a downlink datalink message to a ground station. In some examples, CMS 104 is or includes a communications management unit (CMU) or a communications management function (CMF) executed by one or more processors (e.g., processor 116). CMS 104 can also include or be coupled to a flight management system (FMS).

Processor 116 is configured to access the instructions of CPDLC application 120 stored in memory 118 to process and route CPDLC messages to avionics device 102 in the uplink path and to a ground station from avionics device 102 in the downlink path. For example, when CMS 104 receives a CPDLC message, processor 116 implements the instructions of CPDLC application 120 to determine information such as the type of message (e.g., downlink or uplink), the intended recipient, and data embodied in the message. CMS 104 then routes the CPDLC message to its intended recipient based on the determined data in the CPDLC message, and may also store data in the received CPDLC message in memory 118.

In the downlink path, processor 108 is configured to generate a CPDLC message based on the instructions of CPDLC interface application 110. In one example, CPDLC interface application 110 instructs processor 108 to send a call to CMS 104 based on the input data received from HMI 106. In response, CPDLC application 120 instructs processor 116 to generate a draft message with the data provided by avionics device 102 and sends the draft message to processor 108. Processor 108 provides the draft message to HMI 106, where it is displayed to the operator or flight crew for review. The operator or flight crew can then approve or revise the draft message by interfacing with HMI 106. Upon review, the draft message is transmitted from avionics device 102 to CMS 104. CPDLC application 120 then instructs processor 116 to finalize the CPDLC message and to transmit the message to the intended recipient. Alternatively, CPDLC interface application 110 of avionics device 102 generates and finalizes the CPDLC message directly on avionics device 102 without interaction with CMS 104. In such examples, the finalized CPDLC message is sent from avionics device 102 to CMS 104 for routing and transmission to the intended recipient.

In the uplink path, processor 116 receives a CPDLC message and processes the message as previously described. CMS 104 then transmits the CPDLC message to the intended avionics device 102. In response to receiving the CPDLC message, CPDLC interface application 110 instructs processor 108 to display the CPDLC message via HMI 106. The CPDLC message may require response input from the operator or flight crew. Accordingly, in some examples processor 108 undergoes further processing of the CPDLC message and optionally stores data in memory 112.

In some embodiments, avionics device 102 and CMS 104 are configured for processing datalink messages in other formats different from CPDLC.

Processor 108, processor 116, or any of the processing systems described herein may include any one or combination of processors, microprocessors, digital signal processors, application specific integrated circuits, field programmable gate arrays, and/or other similar variants thereof. Any processing systems may also include, or function with, software programs, firmware, or other computer readable instructions for carrying out various process tasks, calculations, and control functions, used in the methods described below. These instructions are typically tangibly embodied on any storage media (or computer readable media) used for storage of computer readable instructions or data structures.

Memory 112, memory 118, or any of the storage systems described herein can include any available storage media (or computer readable medium) that can be accessed by a general purpose or special purpose computer or processor, or any programmable logic device. Suitable computer readable media may include storage or memory media such as semiconductor, magnetic, and/or optical media, and may be embodied as a program product comprising instructions stored in non-transitory computer readable media, such as random access memory (RAM), read-only memory (ROM), non-volatile RAM, electrically-erasable programmable ROM, flash memory, or other storage media. The memory may also include one or more databases to store acquired data. Each storage system can be implemented by appropriate circuitry.

As previously described, HMI 106 is configured for displaying datalink messages received from one or more ground stations to the vehicle operator. HMI 106 may include one or more display screens, and each display screen can display multiple panels that each comprise information important or useful for vehicle navigation to the operator. Furthermore, the vehicle operator may utilize multiple avionics devices 102, each comprising an HMI 106. When a datalink message is received from at least one ground station, the vehicle operator must ordinarily navigate between multiple panels in order to view, and subsequently respond to, the datalink message.

Referencing the exemplary embodiments of FIGS. 1-6, the datalink message processing described herein enables a reduction in the time spent navigating through screens and panels of a display when a datalink message is received. In the embodiments described herein, the vehicle operator can directly navigate and even respond to a datalink message independent of which panels are currently displayed on avionics device 102.

Figure 2:
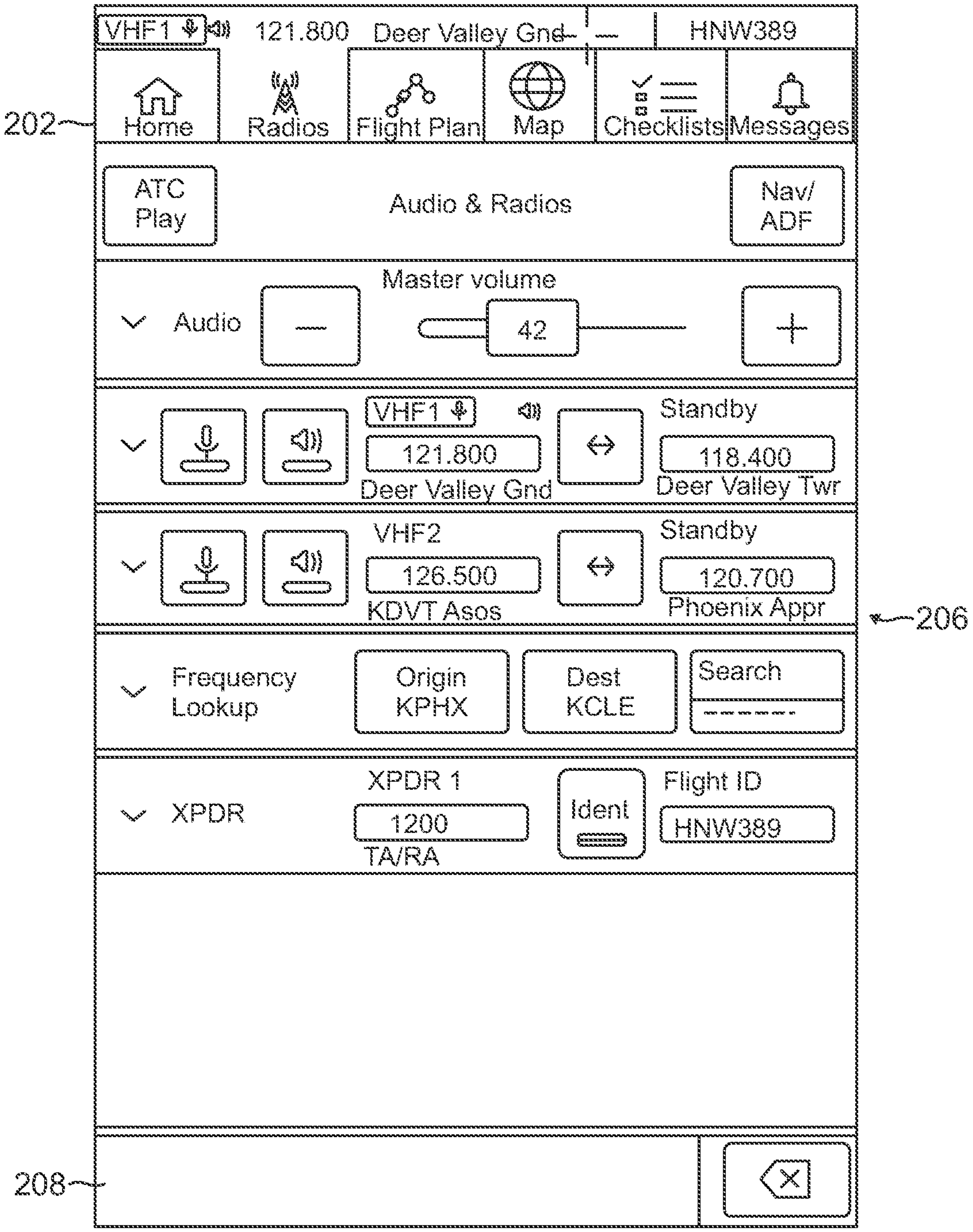
FIG. 2 depicts a screenshot of a user interface including a shared panel between multiple CPDLC functions, as described in one or more embodiments.
Figure 4:
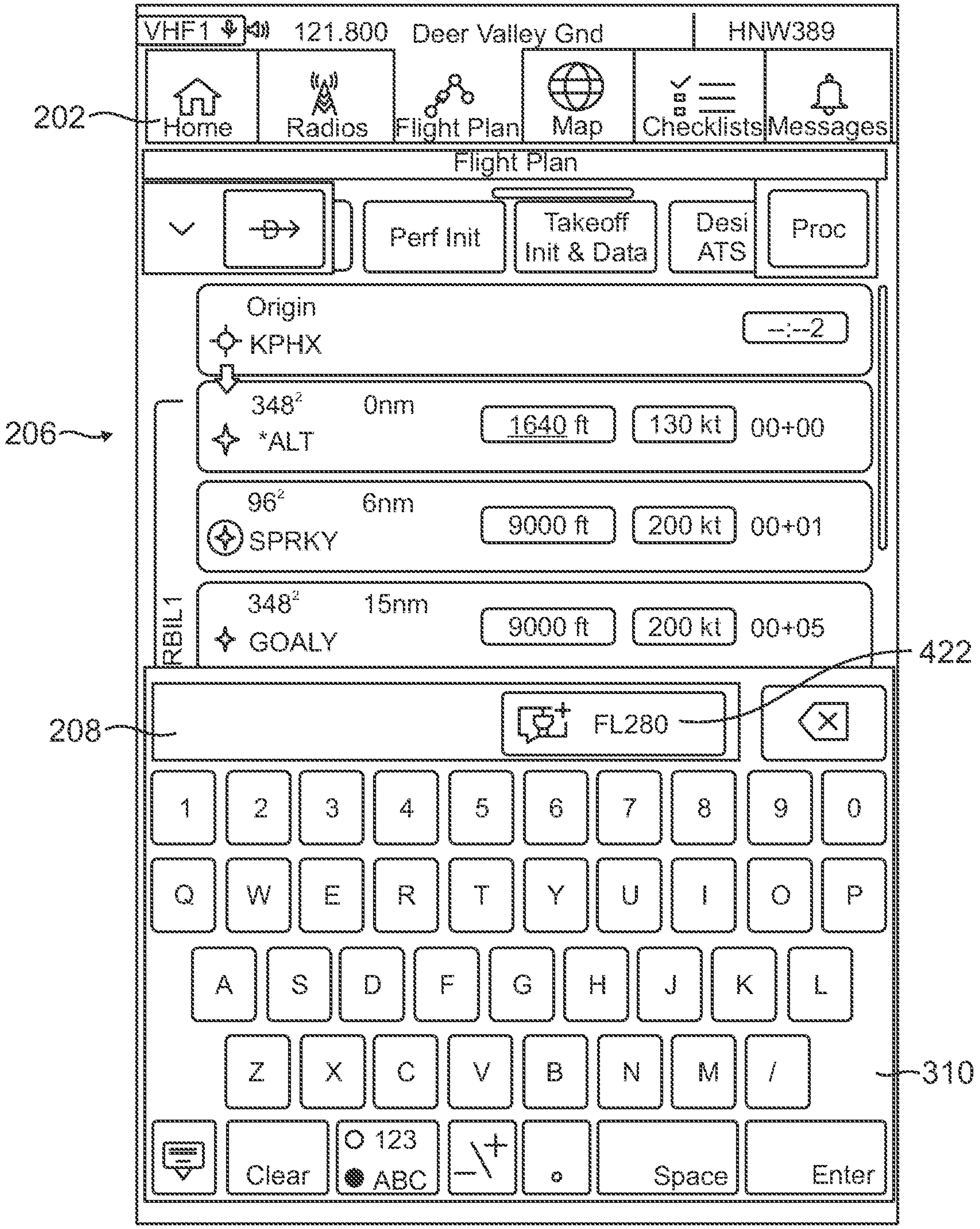
FIG. 4 depicts a screenshot of a user interface including a datalink label displayed in a shared panel, as described in one or more embodiments.

One embodiment of a user interface in which the message processing functions can be utilized is depicted in FIG. 2. The screenshot depicted in FIG. 2 is an example of a user interface that could be displayed by HMI 106 of avionics device 102. The user interface displays a plurality of panels that can be presented to the operator. Some panels include buttons or other appropriate selection indicators that, upon selection by an appropriate input device, can be expanded into additional panels associated with the buttons displayed on a given panel. For example, in the example shown in FIG. 2, a subject panel 202 is displayed horizontally across the top row of the user interface. Subject panel 202 comprises a plurality of buttons that each correspond to different functions supported by avionics device 102. In some embodiments, some buttons correspond to CPDLC functions that are supported by the CPDLC interface application 110 stored in avionics device 102. However, buttons corresponding to other functions outside of CPDLC may also be displayed on subject panel 202. Depending on the implementation, subject panel 202 comprises other information (a title page, actionable objects, etc.). Upon selection of one of these buttons, the panels 206 displayed further below subject panel 202 change according to the format and functionality associated with the selected button. For example, subject panel 202 may include a button associated with datalink messaging, which upon selection of the button, displays the datalink messages received and/or transmitted between one or more ground stations. Accordingly, the content and structure of the panel(s) 206 will differ depending on which button of subject panel 202 is selected. Additionally, the functionality that is displayed on the user interface can be presented in other formats than as shown in FIG. 4 (and the accompanying diagrams).

As previously noted, each button on subject panel 202 is associated with a plurality of panels 206 that is presented on the user interface when the button is selected. In the embodiment of FIG. 2, the button titled "Radios" is selected in subject panel 202, which displays the panels 206 shown in FIG. 2 to the operator. In this embodiment, each of the panels 206 includes parameters describing the operation of the radios onboard the vehicle, as well as buttons that are configured to display additional information and/or provide additional functionality associated with the radios onboard the vehicle when selected. In some embodiments, the panels 206 may include numerical displays that are configured to receive input (e.g., in the form of numerical values); upon doing so, the numerical input provided to the user interface can cause the functionality of the radios to change. One example is the frequency of a signal transmitted by a radio, which can be adjusted according to the frequency specified by the operator (within appropriate limits).

The user interface in FIG. 2 also includes a panel 208 that is displayed independent of subject panel 202 and the panels 206 on the user interface. That is, panel 208 is always displayed on the user interface regardless of which CPDLC or other function is selected by the vehicle operator. This panel 208 is referred to herein as a "shared panel" because the panel is shared between two or more (preferably, all) of the functions supported by avionics device 102. Shared panel 208 is configured to display input from the operator. In some embodiments, shared panel 208 displays textual input including letters and numbers input into avionics device 102 by the vehicle operator. Graphical input from the vehicle operator or another system can also be displayed in shared panel 208, including datalink labels generated by avionics device 102 as further described. In circumstances where a large amount of text is input into shared panel 208 (e.g., the total amount of text exceeds the maximum number of characters displayable on shared panel 208), older text input can be hidden until retrieved, for example, by selecting shared panel 208 and "scrolling" through the previous text input, via a dedicated panel displaying input contents, or with other means.

Figure 3:
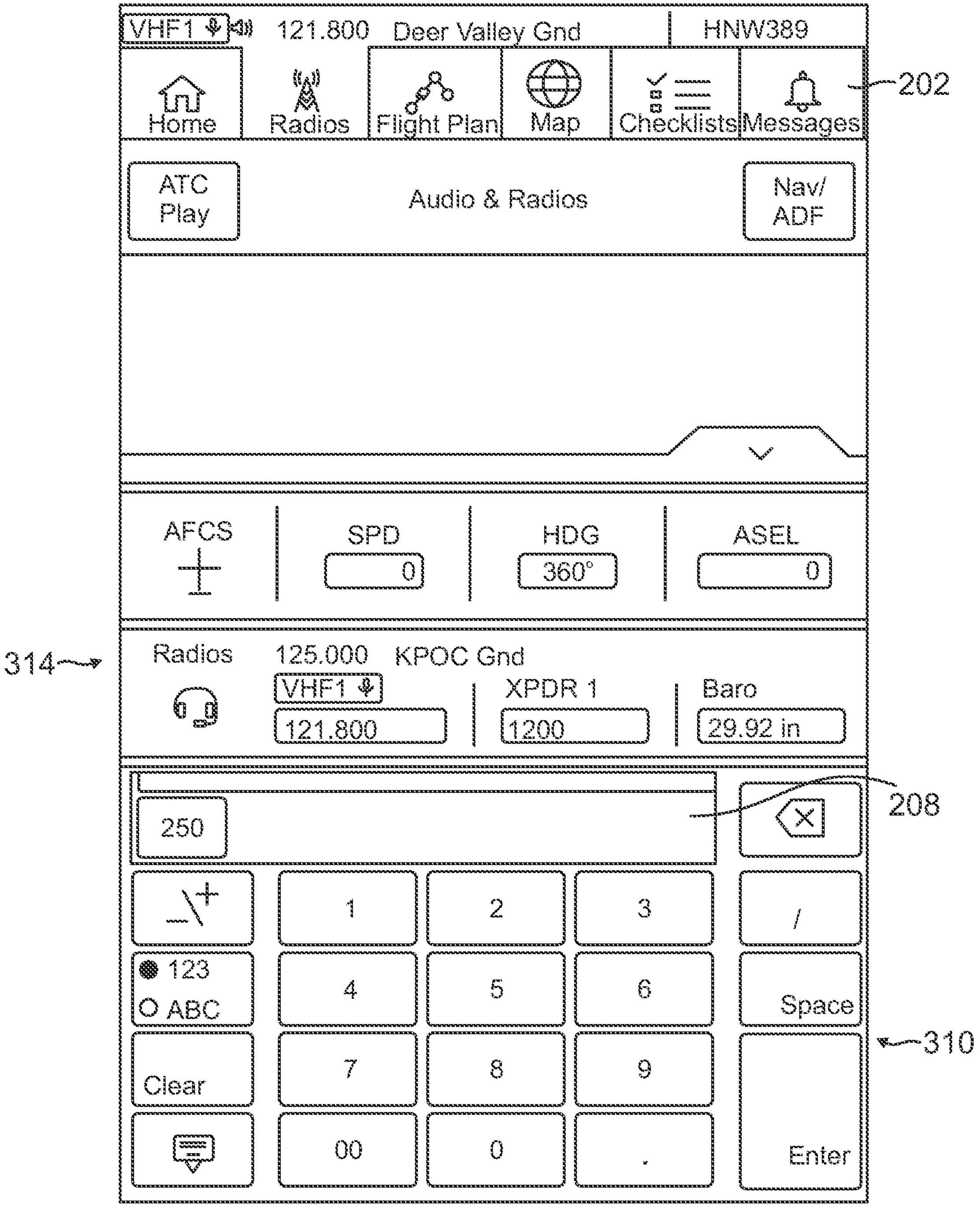
FIG. 3 depicts a screenshot of a user interface including input panels displayed in response to input received in a shared panel, as described in one or more embodiments.

Another exemplary embodiment of shared panel 208 and its associated functionality is depicted in FIG. 3. FIG. 3 specifically depicts another representation of a user interface that can be displayed on HMI 106 of avionics device 102. As shown in FIG. 3, shared panel 208 includes textual input received by avionics device 102, specifically the text "250", which is displayed on a portion of shared panel 208 (along with any other received input that can be displayed within the dimensions of shared panel 208). For example, the operator can input text into shared panel 208 by selecting one or more of the numerical buttons displayed on the keypad panel 310 positioned below shared panel 208. In some embodiments, keypad panel 310 can include other buttons for other text, such as letters, characters, indicators, etc.; additional text can be selected by expanding keypad panel 310 with the additional text buttons and/or by replacing the layout of the numerical buttons currently displayed in keypad panel 310.

Notably, shared panel 208 incorporates CPDLC and other functionality based on the input received from the vehicle operator. When avionics device 102 receives input corresponding to shared panel 208, it is configured to display additional input panels 314 based on the type of input received. In some embodiments, the layout of the input panel 314 changes (e.g., approximately in real-time) as the received input changes. For example, when the vehicle operator enters "250" into shared panel 208, one or more input panels 314 are then displayed that correlate to a value of 250. As shown in FIG. 3, the input of "250" results in two sub-panels being displayed: one corresponding to parameters related to movement of the vehicle, and another corresponding to the radio frequency characteristics of a radio communicating with a ground station. Hence, shared panel 208 is also referred to herein as a "smart scratchpad", due to the functionality of associating and presenting additional CPDLC functions (or vehicle functions more generally) responsive to the input that is received for display on shared panel 208. In some embodiments, the correlation function used to generate the input panels 314 can be defined to associate functions that are reasonably correlated with the input displayed on shared panel 208. In some cases, a text of "250" is not a proper parameter for an orientation or velocity determined by a sensor/equipment, as an example, and so such information for that sensor/equipment may not be displayed when the text of "250" is input and displayed on shared panel 208.

In some embodiments, one or more of the input panels 314 can include selection capability so that the vehicle operator can provide further input and/or selections on the input panels 314. For example, in the embodiment of FIG. 3, the pilot can select the frequency of the radio that is communicating with a designated ground station. If the operator desires to change the transmission frequency of the radio to a different frequency (e.g., to a value of 250), after selecting the portion of input panel 314 displaying the frequency ("121.800") the operator can input a new value of "250" (assuming for pedagogical explanation, that such a value would be appropriate). Upon entering the new value of "250", the transmission frequency of the radio that corresponds to the information displayed in input panel 314 can be changed to the new frequency 250 (or, if an invalid value is input, an appropriate error message can be displayed). Shared panel 208 can associate and display other information than as shown in FIG. 3, based on the input that is received by avionics device 102.

The inclusion of shared panel 208 enables the operator to easily view and utilize CPDLC functions supported by avionics device 102 without having to directly navigate back and forth between the specific panels associated with each respective CPDLC function. During this time, the vehicle may receive one or more datalink messages with one or more ground stations. Traditionally, the operator would need to navigate to a dedicated panel for displaying, generating, and sending datalink messages. With the inclusion of shared panel 208, the operator is able to input appropriate information into shared panel 208 to display the appropriate panel(s) for datalink messaging functions supported by avionics device 102. However, even in this case, the operator must manually input the appropriate information to trigger the datalink messaging panel(s) to be displayed. This takes some time for the operator to input this information, can distract the operator from other tasks they are using shared panel 208 for, and can clog up shared panel 208 with additional input. In some situations, the operator may not even be (at least immediately) aware that a datalink message has been received, thereby frustrating or defeating the advantages provided by shared panel 208.

To further improve the functionality of CPDLC interfacing, e.g., during vehicle navigation, shared panel 208 is also configured to display datalink labels 422. An exemplary embodiment of the type of datalink labels that can be utilized is depicted in FIG. 4. In the embodiment of FIG. 4, the vehicle has received a datalink message from a ground station that the vehicle is communicating with. The datalink message (not explicitly shown in FIG. 4) can include any kind of information related to vehicle navigation. For example, in the embodiment of FIG. 4, the datalink message includes a command to reach a flight level of 280 (FL280). However, the datalink message can include other information related to vehicle navigation.

Referring to FIGS. 1 and 4, when the vehicle receives a datalink message, CMS 104 is configured to process the datalink message to determine which avionics device 102 the message is intended for. Upon receiving the datalink message, processor 108 is configured to generate a datalink label 422 that corresponds to the datalink message. HMI 106 then displays datalink label 422 on a portion of shared panel 208. Datalink label 422 can be displayed in any type of format that indicates to the operator that a datalink message has been received. In some embodiments, datalink label 422 includes text, graphics, or other indicators that convey some information about the datalink message to the operator. For example, in the embodiment of FIG. 4, datalink label 422 includes a graphic indicator representing a ground station inside of a speech bubble; the speech bubble thereby indicates to the operator that a new message is received while the ground station icon represents that the new message is a datalink message from a ground station. Also shown in datalink label 422 is the text "FL280" that indicates to the operator that the datalink message includes a command to reach flight level 280 as defined by industry standards of datalink communication. In some embodiments, datalink label 422 is generated and displayed based on a priority of the datalink message that is received; for example, datalink label 422 can have different characteristics based on the priority of the datalink message and/or datalink label 422 can be generated only for certain types of datalink messages (e.g., high priority messages).

Datalink label 422 can be displayed in other formats on shared panel 208. For example, datalink label 422 can be displayed in different colors or use different graphic icons and text. Because datalink label 422 can be displayed in a compact format, datalink label 422 can also be described as a "chicklet" or "datalink chicklet". In some embodiments, datalink label 422 is displayed on an opposite side of shared panel 208 as the side that would display text entered by the operator, so that the automatic display of datalink label 422 does not interrupt or interfere with the text entered by the operator. In automatically generating and displaying datalink label 422 on shared panel 208, the operator is immediately made aware of the existence of a new datalink message without having to navigate through panels and/or menus to check on datalink communication status.

Another notable feature of datalink label 422 is that it can be used to display and even respond to the datalink message when interacted with by the operator. This feature is further depicted in FIG. 5. In this embodiment, processor 108 can receive selection of datalink label 422 through suitable input from the operator (by clicking, touching, or otherwise selecting datalink label 422 on the screen of HMI 106, for example). When processor 108 receives selection of datalink label 422, it can change one or more characteristics of datalink label 422 in response, and the modified datalink label 422 can be displayed on HMI 106. For example, upon receiving selection, processor 108 can change the color of datalink label 422, thereby indicating to the operator that the selection of datalink label 422 has been received.

Figure 5:
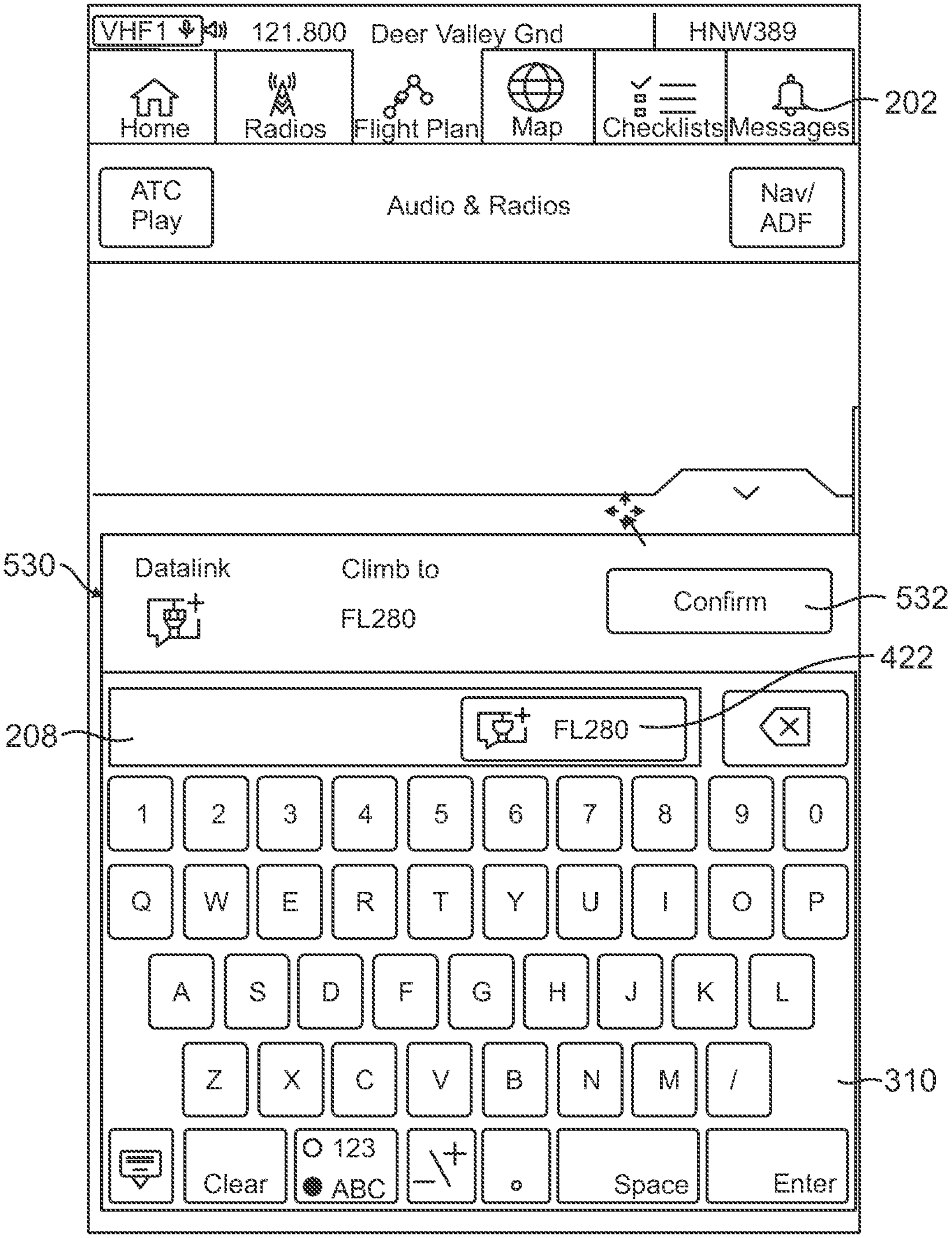
FIG. 5 depicts a screenshot of a user interface including a message panel generated in response to selection of a datalink label, as described in one or more embodiments.

Additionally, processor 108 is configured to generate one or more sub-panels 530 on the screen of HMI 106 in response to receiving selection of datalink label 422. As shown in the embodiment of FIG. 5, processor 108 generates the sub-panel 530 that includes a duplication of the graphic icon displayed on datalink label 422, as well as the text of the datalink message, which reads "Climb to FL 280". In this embodiment, HMI 106 displays sub-panel 530 directly above shared panel 208 on the screen. In some embodiments, to remove sub-panel 530 the operator can simply select datalink label 422 again, which signals to processor 108 to remove sub-panel 530. In some embodiments, sub-panel 530 includes one or more buttons 532 configured to receive user input. In the embodiment of FIG. 5, button 532 is a confirm button that the operator can select. When selected, processor 108 automatically generates a datalink message that acknowledges the command to climb to FL280 to the ground station that transmitted the message. The datalink message generated by processor 108 can be sent to CMS 104 for transmission to the ground station, or alternatively, can be directly sent to the ground station from avionics device 102 if such functionality is supported. Other buttons for automatically generating different types of datalink message responses can be displayed in sub-panel 530. In displaying and responding to the datalink message in sub-panel 530, the operator does not need to enter text in shared panel 208 to trigger the appropriate panels and/or menus in order to access the datalink message. Instead, the vehicle operator can simply access and utilize the datalink messaging functionality supported by avionics device 102 on the same screen regardless of which function (e.g., as displayed on subject panel 202) is currently selected on HMI 106. The operator can also advantageously handle necessary datalink communications on the same page that is displayed on HMI 106 so that the operator can immediately return to the tasks that were previously occupying the operator.

The user interfaces described with respect to FIGS. 2-5 can be represented in other formats than as shown in FIGS. 2-5. For example, shared panel 208 can be displayed in other parts of the screen and can be displayed with other panels than as shown in FIGS. 2-5.

Figure 6:
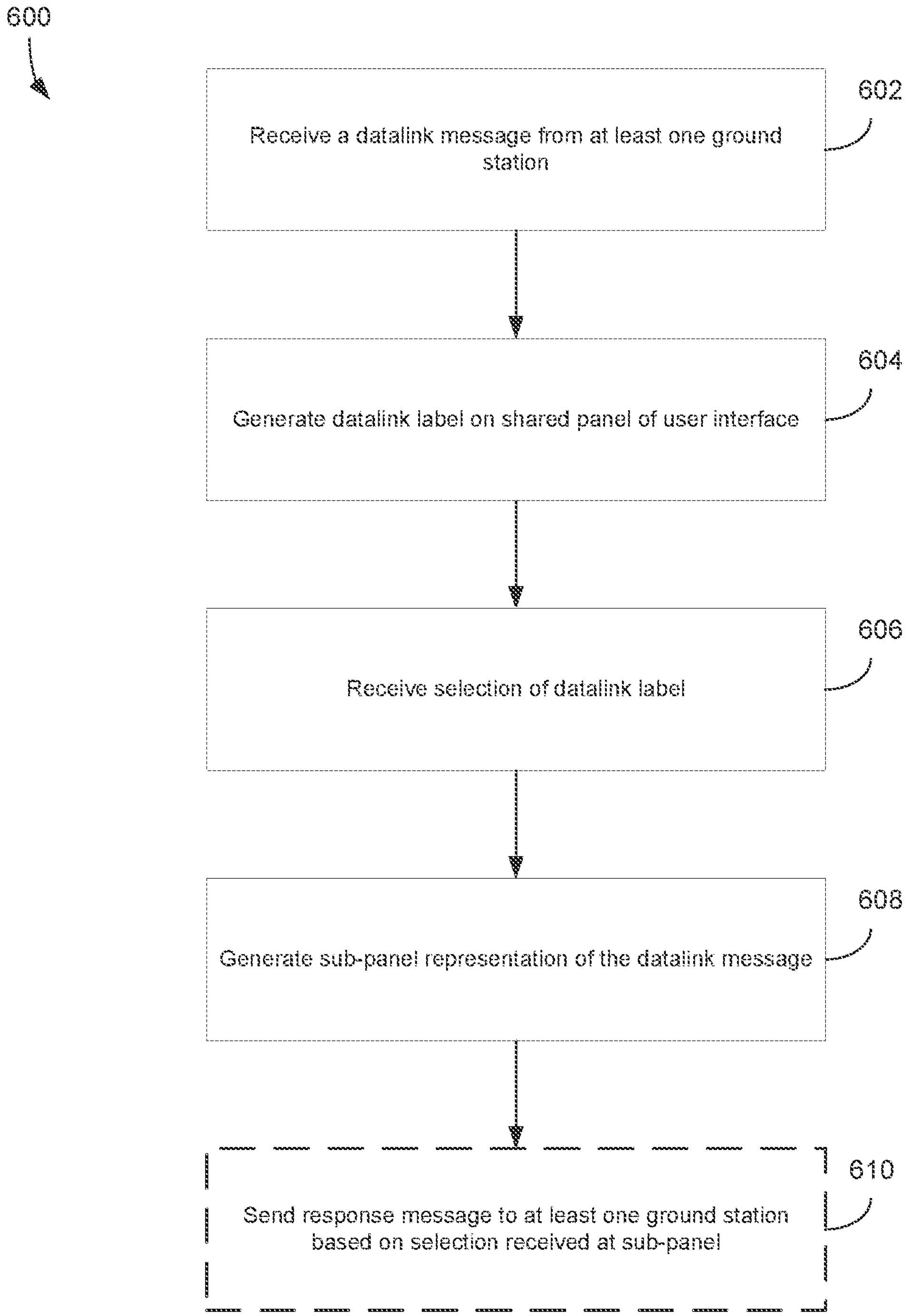
FIG. 6 depicts a flow diagram of a method for displaying a datalink message on an avionics device, as described in one or more embodiments.

FIG. 6 depicts a flow diagram of a method 600 for displaying a datalink message on an avionics device. Method 600 may be implemented via the techniques described with respect to FIGS. 1-5, but may be implemented via other techniques as well. For example, method 600 can be performed via processor 108. The blocks of the flow diagram have been arranged in a generally sequential manner for ease of explanation; however, it is to be understood that this arrangement is merely exemplary, and it should be recognized that the processing associated with the methods described herein (and the blocks shown in the Figures) may occur in a different order (for example, where at least some of the processing associated with the blocks is performed in parallel and/or in an event-driven manner).

Method 600 includes receiving a datalink message from at least one ground station at block 602. The datalink message can be received initially by CMS 104 and sent to avionics device 102. In response to receiving the datalink message, method 600 generates at block 604 a datalink label configured to be displayed on a user interface (e.g., a display screen) of the avionics device 102, such as HMI 106 shown and described with respect to FIG. 1. Specifically, the datalink label is configured to be displayed on a shared panel of the user interface; that is, a panel that is configured to display user input and one that is shared between a plurality of functions supported by avionics device 102, some of which may include the various CPDLC functions supported by CPDLC interface application 110. In doing so, the shared panel is displayed even when the operator navigates to different functions displayed on the user interface. In some embodiments, the datalink label is displayed on the shared panel as a chicklet, and can include any kind of graphic or text indicators that characterize the datalink message and indicate to the vehicle operator that the datalink message has been received.

At block 606, method 600 receives a selection of the datalink label. For example, the vehicle operator can touch, click, or otherwise select the datalink label displayed on the user interface. In some embodiments, method 600 changes one or more characteristics of the datalink label in response to receiving the selection, such as changing the color of the datalink label to indicate that the datalink label has been selected.

Proceeding to block 608, method 600 generates a sub-panel representation of the datalink message in response to receiving a selection of the datalink label. In some embodiments, the sub-panel representation is as shown by sub-panel 530, which can include the content of the datalink message. Additionally, the sub-panel representation can include one or more buttons that when selection is received by the processor, configures the processor to automatically generate a datalink message (for example, to confirm a command received by the ground station). Consequently, method 600 optionally proceeds to block 610 and sends a response message to at least one ground station via the selection received at the sub-panel. This function is optional because the sub-panel representation may not have buttons that automatically generate a response datalink message. In some embodiments, the response datalink message is sent by forwarding the datalink message to the communications management system, which then transmits the response message to the ground station.

The methods and techniques described herein may be implemented in digital electronic circuitry, or with a programmable processor (for example, a special-purpose processor or a general-purpose processor such as a computer) firmware, software, or in various combinations of each. Apparatus embodying these techniques may include appropriate input and output devices, a programmable processor, and a storage medium tangibly embodying program instructions for execution by the programmable processor. A process embodying these techniques may be performed by a programmable processor executing a program of instructions to perform desired functions by operating on input data and generating appropriate output. The techniques may advantageously be implemented in one or more programs that are executable on a programmable system including at least one programmable processor coupled to receive data and instructions from, and to transmit data and instruction to, a data storage system, at least one input device, and at least one output device. Generally, a processor will receive instructions and data from a read-only memory and/or a random-access memory. Storage devices suitable for tangibly embodying computer program instructions and data include all forma of non-volatile memory, including by way of example semiconductor memory devices, such as erasable programmable read-only memory (EPROM), electrically erasable programmable read-only memory (EEPROM), and flash memory devices; magnetic disks such as internal hard disks and removable disks; magneto-optical disks; and the like. Any of the foregoing may be supplemented by, or incorporated in, specially-designed application specific integrated circuits (ASICs).

EXAMPLE EMBODIMENTS

Example 1 includes a system configured to be coupled to a vehicle, the system comprising: at least one processor; and a human-machine interface coupled to the at least one processor and comprising a display screen, wherein the human-machine interface is configured to display a first panel of a plurality of panels on the display screen, wherein in response to determining that a first datalink message for the vehicle has been received, the at least one processor is configured to generate a datalink label, wherein the datalink label corresponds to the first datalink message, wherein the datalink label is configured to be generated in a shared panel of the display screen, wherein the human-machine interface is configured to display the datalink label on the shared panel, wherein the at least one processor is configured to receive a selection of the datalink label, and, in response to receiving the selection, the at least one processor is configured to generate a sub-panel that includes a representation of the first datalink message, wherein the human-machine interface is configured to display the sub-panel on the first panel.

Example 2 includes the system of Example 1, wherein the sub-panel includes a button, wherein the at least one processor is configured to receive a selection of the button, and, in response to receiving the selection, the at least one processor is configured to generate a second datalink message responsive to the first datalink message.

Example 3 includes the system of any of Examples 1-2, wherein the at least one processor is configured to receive user input corresponding to the shared panel, wherein the human-machine interface is configured to display the user input on the shared panel.

Example 4 includes the system of Example 3, wherein in response to receiving the user input corresponding to the shared panel, the at least one processor is configured to: determine one or more parameters correlated with the user input; and generate one or more input panels that include the one or more parameters, wherein the human-machine interface is configured to display the one or more input panels on a portion of the display screen.

Example 5 includes the system of any of Examples 3-4, wherein the user input is displayed on a first side of the shared panel, wherein the datalink label is displayed on a second side of the shared panel.

Example 6 includes the system of any of Examples 1-5, wherein the datalink label includes a text and/or graphic indicator that is representative of the first datalink message.

Example 7 includes the system of any of Examples 1-6, wherein the sub-panel includes at least one of: a graphic indicator shared with the datalink label and/or text in the first datalink message.

Example 8 includes the system of any of Examples 1-7, wherein the shared panel is displayed at a bottom portion of the display screen, wherein when a second panel of the plurality of panels is displayed on the display screen, the shared panel is displayed at the bottom portion of the display screen.

Example 9 includes an avionics device, comprising: at least one processor, wherein the at least one processor is configured to receive a first datalink message transmitted from at least one ground station; and a human-machine interface comprising a display screen coupled to the at least one processor, wherein the human-machine interface is configured to display a first panel of a plurality of panels on the display screen; wherein the at least one processor is configured to generate a datalink label, wherein the datalink label corresponds to the first datalink message, wherein the datalink label is configured to be generated in a shared panel of the display screen, wherein the human-machine interface is configured to display the datalink label on the shared panel, wherein the at least one processor is configured to receive a selection of the datalink label, and, in response to receiving the selection, the at least one processor is configured to generate a sub-panel that includes a representation of the first datalink message, wherein the human-machine interface is configured to display the sub-panel on the first panel.

Example 10 includes the avionics device of Example 9, wherein the at least one processor is configured to receive a second datalink message, wherein in response to receiving the second datalink message, the at least one processor is configured to generate a second datalink label, wherein the human-machine interface is configured to display the second datalink label in the shared panel.

Example 11 includes the avionics device of any of Examples 9-10, wherein the sub-panel includes a button, wherein the at least one processor is configured to receive a selection of the button, and, in response to receiving the selection, the at least one processor is configured to generate a second datalink message responsive to the first datalink message.

Example 12 includes the avionics device of any of Examples 9-11, wherein the at least one processor is configured to receive user input corresponding to the shared panel, wherein the human-machine interface is configured to display the user input on the shared panel.

Example 13 includes the avionics device of Example 12, wherein in response to receiving the user input corresponding to the shared panel, the at least one processor is configured to: determine one or more parameters correlated with the user input; and generate one or more input panels that include the one or more parameters, wherein the human-machine interface is configured to display the one or more input panels on a portion of the display screen.

Example 14 includes the avionics device of any of Examples 12-13, wherein the user input is displayed on a first side of the shared panel, wherein the datalink label is displayed on a second side of the shared panel.

Example 15 includes the avionics device of any of Examples 9-14, wherein the sub-panel includes at least one of: a graphic indicator shared with the datalink label and/or text in the first datalink message.

Example 16 includes a method, comprising: receiving a datalink message from at least one ground station; generating a datalink label in response to receiving the datalink message, wherein the datalink label is displayed on a shared panel of a display screen; receiving a selection of the datalink label displayed on the shared panel; and in response to receiving the selection of the datalink label, generating a sub-panel representation of the datalink message, wherein the sub-panel representation is displayed on the display screen.

Example 17 includes the method of Example 16, wherein the sub-panel includes a button, and further comprising: receiving a selection of the button; and in response to receiving the selection of the button, sending a response message to the at least one ground station.

Example 18 includes the method of any of Examples 16-17, comprising: receiving user input corresponding to the shared panel; and displaying the user input on the shared panel.

Example 19 includes the method of Example 18, comprising: displaying the user input on a first side of the shared panel, displaying the datalink label on a second side of the shared panel.

Example 20 includes the method of any of Examples 16-19, wherein the datalink label includes a text and/or graphic indicator that is representative of the datalink message.

Although specific embodiments have been illustrated and described herein, it will be appreciated by those of ordinary skill in the art that any arrangement, which is calculated to achieve the same purpose, may be substituted for the specific embodiments shown. Therefore, it is manifestly intended that this invention be limited only by the claims and the equivalents thereof.

What is claimed is:

1. A system configured to be coupled to a vehicle, the system comprising:

an avionics device comprising:

at least one processor; and a human-machine interface coupled to the at least one processor and comprising a display screen, wherein the human-machine interface is configured to display a first panel of a plurality of panels on the display screen, wherein each panel of the plurality of the panels is associated with at least one function, wherein each panel in the plurality of the panels displayed on the display screen at a same time are associated with a corresponding subject in a plurality of subjects, wherein the first panel displays information associated with the corresponding subject;

wherein in response to determining that a first datalink message for the vehicle has been received, the at least one processor is configured to generate a datalink label, wherein the datalink label corresponds to the first datalink message, wherein the datalink label is configured to be generated in a shared panel of the plurality of panels of the display screen, wherein the shared panel is different from the first panel and displayed independent of the first panel, wherein the shared panel is configured to display textual user input including letters and numbers input into the avionics device by a vehicle operator, wherein in response to receiving the textual user input corresponding to the shared panel, the at least one processor is configured to:

determine one or more parameters correlated with the textual user input; and generate one or more input panels that include the one or more parameters, wherein the human-machine interface is configured to display the one or more input panels on a portion of the display screen;

wherein the human-machine interface is configured to display the datalink label on the shared panel, wherein the shared panel is shared between two or more functions across two or more subjects, wherein the at least one processor is configured to receive a selection of the datalink label, and, in response to receiving the selection, the at least one processor is configured to generate a sub-panel that includes a representation of the first datalink message, and wherein the human-machine interface is configured to display the sub-panel within the first panel.

2. The system of claim 1, wherein the sub-panel includes a button, wherein the at least one processor is configured to receive a selection of the button, and, in response to receiving the selection, the at least one processor is configured to generate a second datalink message responsive to the first datalink message.

3. The system of claim 1, wherein the textual user input is displayed on a first side of the shared panel, wherein the datalink label is displayed on a second side of the shared panel.

4. The system of claim 1, wherein the datalink label includes a text and/or graphic indicator that is representative of the first datalink message.

5. The system of claim 1, wherein the sub-panel includes at least one of: a graphic indicator shared with the datalink label and/or text in the first datalink message.

6. The system of claim 1, wherein the shared panel is displayed at a bottom portion of the display screen, wherein when a second panel of the plurality of panels is displayed on the display screen, the shared panel is displayed at the bottom portion of the display screen.

7. An avionics device, comprising:

at least one processor, wherein the at least one processor is configured to receive a first datalink message transmitted from at least one ground station; and a human-machine interface comprising a display screen coupled to the at least one processor, wherein the human-machine interface is configured to display a first panel of a plurality of panels on the display screen, wherein each panel of the plurality of the panels is associated with at least one function, wherein each panel in the plurality of the panels displayed on the display screen at a same time are associated with a corresponding subject in a plurality of subjects, wherein the first panel displays information associated with the corresponding subject;

wherein the at least one processor is configured to generate a datalink label, wherein the datalink label corresponds to the first datalink message, wherein the datalink label is configured to be generated in a shared panel of the plurality of panels of the display screen, wherein the shared panel is different from the first panel and displayed independent of the first panel, wherein the shared panel is configured to display textual user input including letters and numbers input into the avionics device by a vehicle operator, wherein in response to receiving the textual user input corresponding to the shared panel, the at least one processor is configured to:

determine one or more parameters correlated with the textual user input; and generate one or more input panels that include the one or more parameters;

wherein the human-machine interface is configured to display the one or more input panels on a portion of the display screen;

wherein the human-machine interface is configured to display the datalink label on the shared panel, wherein the shared panel is a panel shared between two or more functions across two or more subjects, wherein the at least one processor is configured to receive a selection of the datalink label, and, in response to receiving the selection, the at least one processor is configured to generate a sub-panel that includes a representation of the first datalink message, wherein the human-machine interface is configured to display the sub-panel within the first panel.

8. The avionics device of claim 7, wherein the at least one processor is configured to receive a second datalink message, wherein in response to receiving the second datalink message, the at least one processor is configured to generate a second datalink label, wherein the human-machine interface is configured to display the second datalink label in the shared panel.

9. The avionics device of claim 7, wherein the sub-panel includes a button, wherein the at least one processor is configured to receive a selection of the button, and, in response to receiving the selection, the at least one processor is configured to generate a second datalink message responsive to the first datalink message.

10. The avionics device of claim 7, wherein the user input is displayed on a first side of the shared panel, wherein the datalink label is displayed on a second side of the shared panel.

11. The avionics device of claim 7, wherein the sub-panel includes at least one of: a graphic indicator shared with the datalink label and/or text in the first datalink message.

12. A method, comprising:

receiving a datalink message from at least one ground station;

generating a datalink label in response to receiving the datalink message, wherein the datalink label is displayed on a shared panel of a display screen, wherein the shared panel is a panel shared between two or more functions across two or more subjects, wherein a plurality of panels are displayed on the display screen, wherein each panel of the plurality of the panels is associated with at least one function and each panel in the plurality of panels displayed on the display screen at a same time are associated with a corresponding subject in a plurality of subjects, wherein the shared panel is displayed independent of first panel, wherein the shared panel is configured to display textual user input including letters and numbers input into an avionics device by a vehicle operator;

receiving the user input corresponding to the shared panel;

in response to receiving the user input corresponding to the shared panel:

determining one or more parameters correlated with the user input; and generating one or more input panels that include the one or more parameters, wherein human-machine interface is configured to display the one or more input panels on a portion of the display screen;

receiving a selection of the datalink label displayed on the shared panel; and in response to receiving the selection of the datalink label, generating a sub-panel representation of the datalink message, wherein the sub-panel representation is displayed on the display screen within the first panel.

13. The method of claim 12, wherein the sub-panel includes a button, and further comprising:

receiving a selection of the button; and in response to receiving the selection of the button, sending a response message to the at least one ground station.

14. The method of claim 12, comprising:

displaying the user input on a first side of the shared panel, displaying the datalink label on a second side of the shared panel.

15. The method of claim 12, wherein the datalink label includes a text and/or graphic indicator that is representative of the datalink message.

* * * * *